UNITED STATES PATENT OFFICE.

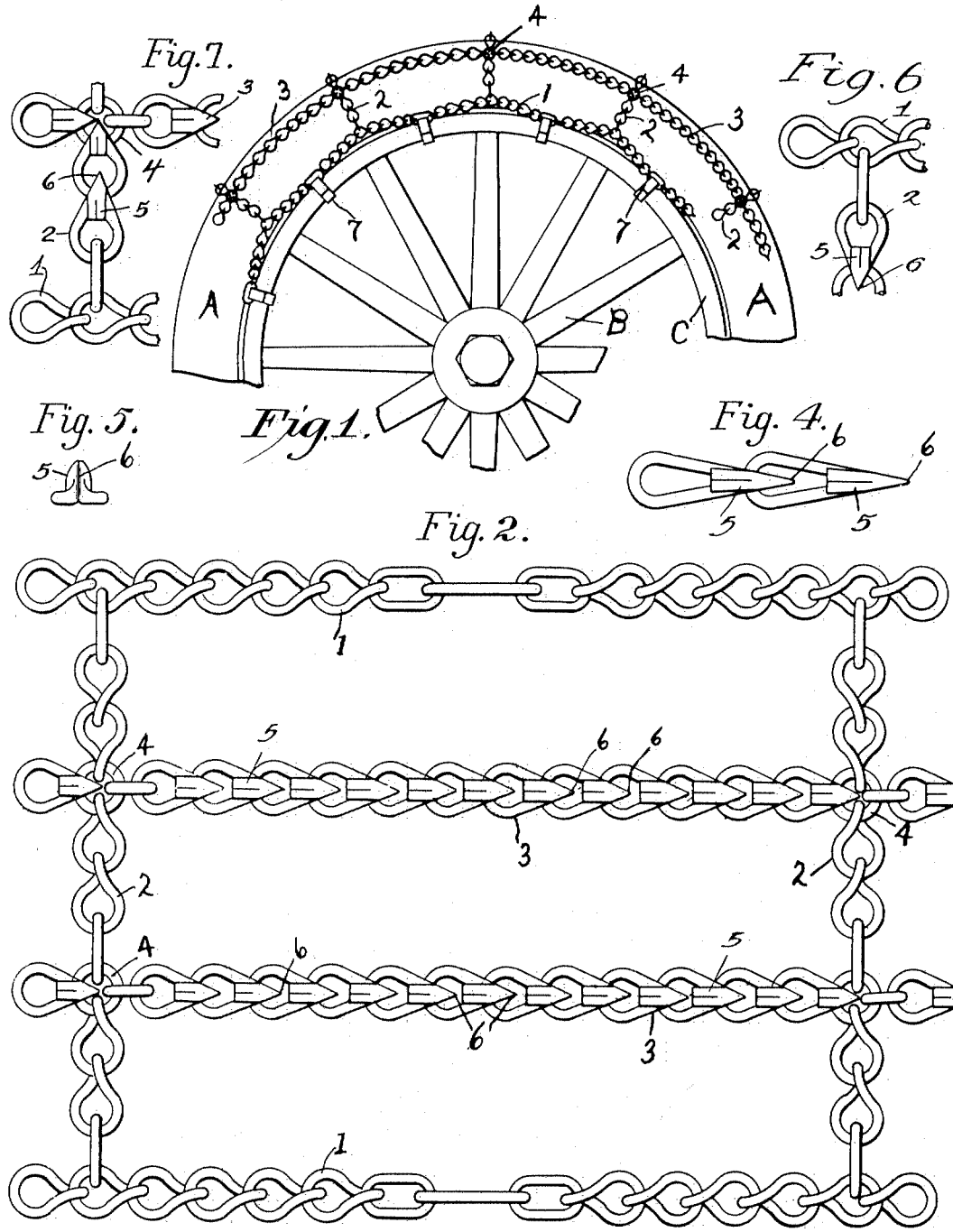

WILLIAM SCHWARTZ, OF SCOTTDALE, PENNSYLVANIA.

ANTISKID-CHAIN.

1,315,866.  Specification of Letters Patent.  Patented Sept. 9, 1919.

Application filed May 27, 1918. Serial No. 236,689.

*To all whom it may concern:*

Be it known that I, WILLIAM SCHWARTZ, a citizen of the United States, and resident of Scottdale, in the county of Westmoreland and State of Pennsylvania, have invented a new and useful Improvement in Antiskid-Chains; and I do hereby declare the following to be a full, clear, and exact description thereof.

This invention relates to improvements in anti-skidding chains for elastic tires, and is particularly applicable to provide an antiskid tread for pneumatic tires for automobiles to prevent slipping upon wet, muddy or icy pavements.

It is well known that in the operation of these machines over slippery pavements, and particularly where such pavements are rounded or sloped transversely, the rear or traction wheels are inclined to skid or slide laterally, which will throw the rear wheels out of alinement, and thus render the steering mechanism ineffective. This is particularly true on country roads, which are usually narrow and guttered at either side, as well as in descending hills, where the speed of the vehicle is usually retarded, and on account of the excessive weight at the rear of the vehicle, the rear or traction wheels will frequently slide to one side of the road to such an extent as to endanger the vehicle, and in fact, as is often the case, overturn the same.

The object of my invention is to provide an anti-skid chain, or removable gripping tread, which is flexible in all directions and is provided with circumferentially arranged tread portions to prevent side skidding, and laterally arranged traction portions.

Another object is to construct and apply the chain to relieve as far as possible the direct wear upon the tires, thereby prolonging the life of such tires and preventing undue abrasion while traveling.

A still further object is to construct the circumferentially arranged tread portions so as to prevent side skidding by having a sharpened surface next to and engaging the road, while their sides next to and engaging the tire will be comparatively flat with rounded edges, and thus prevent injury to the tire, while at the same time permitting positive engagement with the road.

My invention also has for one of its important objects the provision of locking members engaging the side anchor chains and extending over the felly of the wheel to lock the chains against circumferential movement around the tire.

Other objects and uses will appear in the following description and be illustrated in the accompanying drawings, in which:

Figure 1 is a side elevation of a wheel partly broken away, showing my improved chain in position;

Fig. 2 is a plan view of a portion of the chain laid flat and removed from the wheel.

Fig. 3 is a detail view of one of the locking members;

Fig. 4 is an enlarged detail view showing a modified form of two links of the invention.

Fig. 5 is an end view of one of such links showing the sharpened portion.

Fig. 6 is a detail view showing a modified form of a portion of the traction chain; and Fig. 7 is a detail view showing a modified form of a portion of the traction chain and its connection with the anchor and tread chains.

Similar reference characters indicate corresponding parts in all of the views of the drawings.

A represents the usual pneumatic tire as mounted upon a suitable wheel B having a felly C. My improved chain is mounted upon the tire A and consists essentially of opposite circular anchor chains 1, a series of traction chains 2 arranged transversely and secured to the chains 1, and circumferentially arranged tread chains 3 which are spaced apart and secured to the traction chains 2 by suitable links or rings 4. The circular anchor chains 1 are substantially identical in construction and are located at opposite sides of the tire, but are of less diameter than said tire. The chains 1 have any ordinary style of hooked link (not shown) at one end for detachably connecting or interlocking with the link at the other end (not shown) to permit of the device being removed from and replaced on the tire when desired.

The chain members 2 and 3 are arranged to provide substantially rectangular spaces, with the chains 2 extending transversely of the tire, and the chains 3 extending circumferentially at each side of the tread of the tire, such chains 2 and 3 being the road gripping chains.

The circumferentially arranged chains 3 have wedge-shaped projecting portions 5 on the sides of each link which are sharpened on their outer faces, as at 6, as clearly shown in Fig. 5 of the drawings, and such sharpened portions provide a gripping tread to firmly engage the road and prevent side swinging or skidding.

Spaced at intervals around the anchor chains 1 are a plurality of locking members 7, which comprise a suitable member 8 having its one end provided with a hook portion 9 adapted to be arranged in one of the links of the anchor members, while its other end is provided with a pivoted arm 10 adapted to be engaged in one of the link members of the opposite anchor chain and to be doubled back upon the saddle member 8 and held in position by a slidable link 11. The locking members 7 are adapted to have the saddle portion 8 passed over to rest upon the felly C of the wheel, and when locked in position will prevent the circumferential travel of the device around the tire. It will be understood, however, that any number of the locking members 7 may be used as is desired.

I wish to draw particular attention to the arrangement of the circumferentially arranged tread chains and their specific construction of providing a sharpened edge for engaging the road and to the cross traction chains, which serve to prevent the tire moving or spinning without a gripping effect upon a slippery street.

Further particular attention is also directed to my novel form of locking device in combination with the chain, which prevents the circumferential travel of the same upon the tire and accompanying wear.

It will be understood that while I have shown and described only the tread chains 3 as having projecting portions provided with a sharpened contacting surface, I may sharpen the contacting surface of the traction cross chains 2 if desired as shown in Fig. 6.

It will be readily understood that numerous changes in design and construction of my improved anti-skid chain may be made within the scope of the appended claims by one skilled in the art, without departing from the spirit of my invention.

Having thus described my invention, what I claim is:

1. An anti-skid chain for tires, comprising circumferentially arranged anchor chains, and gripping chains between said anchor chains having wedge-shaped projections thereon extending in the direction of the length of the chain.

2. An anti-skid chain for tires comprising circumferentially arranged anchor chains, and gripping chains between said anchor chains having wedge-shaped projections thereon extending in the direction of the length of the chain and provided with sharpened outer faces.

3. An anti-skid chain for elastic tires comprising circumferentially arranged anchor chains, tread chains having wedge-shaped projections and extending in the direction of the length of the chain, and traction chains on said tread chains.

4. An anti-skid chain for elastic tires comprising circumferentially arranged anchor chains, tread chains having wedge-shaped projections extending in the direction of the length of the chain and provided with sharpened outer faces, and traction chains on said tread chains.

In testimony whereof, I, the said WILLIAM SCHWARTZ, have hereunto set my hand.

WILLIAM SCHWARTZ.

Witnesses:
J. M. GEOGHEGAN,
J. N. COOKE.